(12) United States Patent
Jeong et al.

(10) Patent No.: US 9,721,348 B2
(45) Date of Patent: Aug. 1, 2017

(54) APPARATUS AND METHOD FOR RAW-COST CALCULATION USING ADAPTIVE WINDOW MASK

(71) Applicant: ELECTRONICS AND TELECOMMUNICATIONS RESEARCH INSTITUTE, Daejeon (KR)

(72) Inventors: Jae Chan Jeong, Daejeon (KR); Ji Ho Chang, Daejeon (KR); Seung Min Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/992,984

(22) Filed: Jan. 11, 2016

(65) Prior Publication Data

US 2017/0116739 A1     Apr. 27, 2017

(30) Foreign Application Priority Data

Oct. 23, 2015     (KR) .......................... 10-2015-0148266

(51) Int. Cl.
*G06K 9/00*     (2006.01)
*G06T 7/00*     (2017.01)

(52) U.S. Cl.
CPC ............. *G06T 7/0075* (2013.01); *G06T 7/003* (2013.01); *G06T 7/0079* (2013.01); *G06T 2207/10012* (2013.01); *G06T 2207/20228* (2013.01)

(58) Field of Classification Search
CPC ..... G06T 7/0057; G06T 7/0075; G06T 7/0079; G06T 2207/10012; H04N 13/0239; H04N 13/0253; H04N 5/911
See application file for complete search history.

(56) References Cited

U.S. PATENT DOCUMENTS

| 9,407,896 B2 * | 8/2016 | Lam ................... H04N 13/0011 |
| 2011/0216951 A1 * | 9/2011 | Ye ......................... G06T 7/0012 |
| | | 382/128 |
| 2014/0016845 A1 * | 1/2014 | Gazit ..................... A61B 5/055 |
| | | 382/130 |
| 2014/0184584 A1 | 7/2014 | Reif et al. |
| 2014/0219549 A1 * | 8/2014 | Choi ..................... G06T 7/0075 |
| | | 382/154 |

(Continued)

FOREIGN PATENT DOCUMENTS

KR     10-1475382 B1     12/2014

OTHER PUBLICATIONS

S. Perri, et al. "Adaptive Census Transform : A novel hardware-oriented streovision algorithm," Computer Vision and Image Understanding, Jan. 2013, pp. 29-41, vol. 117, Elsevier.

*Primary Examiner* — Gregory M Desire

(57) ABSTRACT

Disclosed is an apparatus and method for calculating a raw-cost necessary for combining images into one image by matching of stereo images. The raw-cost calculation apparatus includes an image acquirer, a window generator, a window mask generator, a window masker, and a raw-cost calculator. In the raw-cost calculation apparatus and method, a raw cost may be calculated by using an adaptive window mask so that accurate 3D information may be obtained on the boundary of thin structures even when stereo images are matched and combined.

8 Claims, 9 Drawing Sheets

(56) References Cited

U.S. PATENT DOCUMENTS

| | | | |
|---|---|---|---|
| 2016/0037121 A1* | 2/2016 | Chang | G06T 7/0057 348/47 |
| 2016/0173852 A1* | 6/2016 | Moon | G06T 7/0075 348/43 |
| 2016/0300383 A1* | 10/2016 | Liu | G06T 15/04 |

* cited by examiner

· sum of Absolute differences (SAD)

$$C(x,y,d)=\sum_{x\in S}|I_R(x,y)-I_T(x+d,y)|$$

APPARATUS AND METHOD FOR RAW-COST CALCULATION USING ADAPTIVE WINDOW MASK

CROSS-REFERENCE TO RELATED APPLICATION(S)

This application claims priority from Korean Patent Application No. 10-2015-0148266, filed on Oct. 23, 2015, in the Korean Intellectual Property Office, the entire disclosure of which is incorporated herein by reference for all purposes.

BACKGROUND

1. Field

The following description generally relates to matching of stereo images and combining the images into one image, and more particularly to an apparatus and method for calculating a raw cost that is necessary to combine images into one image.

2. Description of the Related Art

Stereo matching has been generally used as a typical method of estimating 3D information. In the stereo matching scheme, 3D information is obtained by using two images captured at the same time with two or more cameras that are installed with a baseline therebetween.

Such stereo matching has a drawback in that accurate 3D information may not be obtained due to insufficient or repetitive texture in an object or background of an image.

In order to solve the drawback, various active stereo matching methods using an active light source and a pattern have been suggested, but there remains a problem that accurate 3D information may not be obtained on a boundary due to an occluded area caused by use of stereo matching.

SUMMARY

Provided is an apparatus and method for raw-cost calculation by using an adaptive window mask, in which while matching stereo images and combining the images, a raw cost is calculated to obtain accurate 3D information even on the boundary of thin structures.

In one general aspect, there is provided a raw-cost calculation apparatus using an adaptive window mask, the apparatus including: an image acquirer configured to acquire image information that includes pattern and texture information of a reference image, and pattern and texture information of a target image; a window generator configured to generate a plurality of windows, each including at least one pixel, by receiving the texture information, included in the acquired image information, from a user, or by dividing the texture information by a predetermined size; a window mask generator configured to generate a window mask, which has a same size as a size of the generated windows, and is capable of converting the pattern information, included in the acquired image information, according to a predetermined algorithm; a window masker configured to perform masking of the reference image and the target image the by using the generated window mask to convert the pattern information of the reference image and the pattern information of the target image included in the acquired image information; and a raw-cost calculator configured to match pattern information of the masked reference image and pattern information of the masked target image to calculate a difference, and to calculate a raw cost based on the difference.

The window generator may generate windows having a size determined depending on resolution of a received texture image or types of objects of the texture image, or according to predetermined criteria.

The window mask generator may generate the window mask that includes a set value for masking, wherein the set value for masking varies depending on a camera setting of the received texture image, a light amount, a state of lighting, and image resolution.

The window mask generator may generate the window mask that includes all pixels of windows in response to the set value for masking being greater than a predetermined value.

By assuming that an absolute difference, calculated by matching windows of the generated reference image and windows of the target image, on an X axis is defined as W, an absolute difference on a Y axis is defined as H, and a maximum absolute difference between images having the X axis and Y axis is defined as D, the raw cost calculator may calculate a volume of the raw cost by using the defined values W, H, and D and according to a predetermined algorithm, and may calculate a final raw cost by combining the calculated volume of raw cost with adjacent pixels.

In another general aspect, there is provided a raw-cost calculation method using an adaptive window mask, the method including: acquiring image information that includes pattern and texture information of a reference image, and pattern and texture information of a target image; generating a plurality of windows, each including at least one pixel, by receiving the texture information, included in the acquired image information, from a user, or by dividing the texture information by a predetermined size; generating a window mask, which has a same size as a size of the generated windows, and is capable of converting the pattern information, included in the acquired image information, according to a predetermined algorithm; performing masking of the reference image and the target image by using the generated window mask to convert the pattern information of the reference image and the pattern information of the target image included in the acquired image information; and matching pattern information of the masked reference image and pattern information of the masked target image to calculate a difference, and calculating a raw cost based on the difference.

The generating of the plurality of windows may include determining a size of windows depending on resolution of a received texture image or types of objects of the texture image, or according to predetermined criteria.

The generating of the window mask may include generating the window mask that includes a set value for masking, wherein the set value for masking varies depending on a camera setting of the received texture image, a light amount, a state of lighting, and image resolution.

The generating of the window mask may include generating the window mask that includes all pixels of windows in response to the set value for masking being greater than a predetermined value.

By assuming that an absolute difference, calculated by matching windows of the generated reference image and windows of the target image, on an X axis is defined as W, an absolute difference on a Y axis is defined as H, and a maximum absolute difference between images having the X axis and Y axis is defined as D, the calculation of the raw cost may include calculating a volume of the raw cost by using the defined values W, H, and D and according to a predetermined algorithm, and calculating a final raw cost by combining the calculated volume of raw cost with adjacent pixels.

Figure 1:
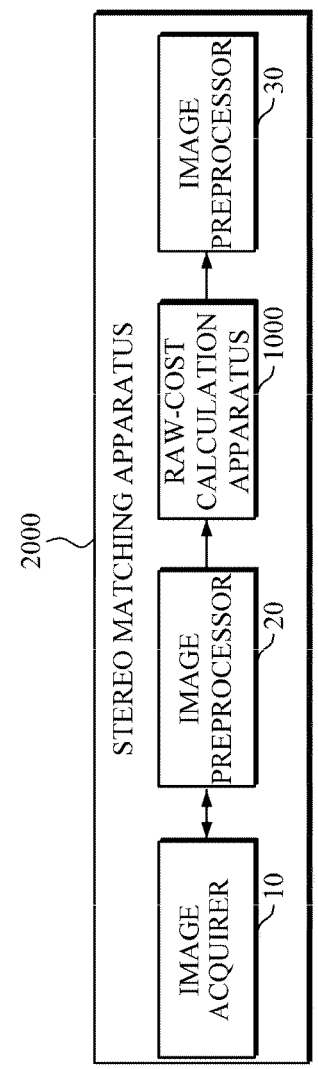
FIG. 1 is a diagram illustrating a stereo matching apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and/or equivalents of the methods, apparatuses, and/or systems described herein will be suggested to those of ordinary skill in the art. Also, descriptions of well-known functions and constructions may be omitted for increased clarity and conciseness.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the apparatus and method for raw-cost calculation using an adaptive window mask will be described with reference to the accompanying drawings.

FIG. 1 is a diagram illustrating a stereo matching apparatus 2000 according to an exemplary embodiment.

Referring to FIG. 1, the stereo matching apparatus 2000 includes an image acquirer 10, an image preprocessor 20, a raw-cost calculation apparatus 1000, and a difference value compensator 30.

The image acquirer 10 may acquire left and right images of an object desired to be photographed by using a stereo camera.

The stereo camera refers to a camera that may acquire two images of an object through two imaging lenses that are spaced apart with a specific distance therebetween.

When images captured by the stereo camera are combined by stereo matching, the combined image appears three-dimensional due to parallax caused by different viewpoints of two lenses.

The image preprocessor 20 may tune an epipolar line and brightness between left and right images by preprocessing such as noise removal or image correction.

The epipolar line refers to a line on a common plane, where two vectors of the position of cameras and an image point viewing the cameras are located, in images acquired from two stereo cameras based on a point defined as an object in a 3D image.

The raw-cost calculation apparatus 1000 acquires preprocessed images and classifies the images into pattern or texture images of a reference image or pattern or texture images of a target image. Then, the raw-cost calculation apparatus 1000 performs masking by generating windows and window masks from the classified images, and matches the masked images to obtain a disparity, so that a raw cost may be calculated based on the disparity.

The raw-cost calculation apparatus 1000 will be described in further detail with reference to FIG. 2.

The difference value compensator 30 may generate a disparity map by using a calculated raw cost, and may perform stereo matching of a reference image and a target image by compensating for a difference value through the generated disparity map.

The disparity map may refer to an absolute difference, i.e., a disparity, which is obtained by matching a reference image and a target image.

Figure 2:
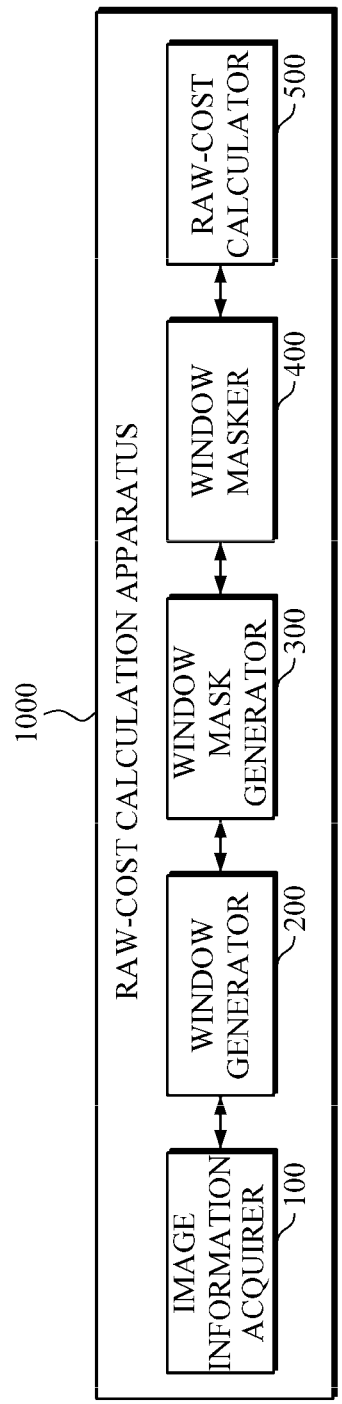
FIG. 2 is a diagram illustrating a raw-cost calculation apparatus using an adaptive window mask according to an exemplary embodiment.

FIG. 2 is a diagram illustrating a raw-cost calculation apparatus using an adaptive window mask according to an exemplary embodiment.

Referring to FIG. 2, the raw-cost calculation apparatus 1000 using an adaptive window mask includes an image information acquirer 100, a window generator 200, a window mask generator 300, a window masker 400, a raw-cost calculator 500.

The image information acquirer 100 may acquire image information that includes pattern and texture information of a reference image and pattern and texture information of a target image.

The texture refers to a two-dimensional (2D) image seen by rendering UV coordinates to a 3D object.

There are various types of textures according to usage, and examples thereof include: a color texture that includes color information regarding colors and textures; a normal texture that represents uneven or detailed shapes; a highlight texture used to represent light reflection to maximize texture representation; and an environment texture that represents the surrounding environment of an object.

The pattern refers to unique characteristics of data that are obtained by analyzing image data.

In one exemplary embodiment, by preparing a pattern of a reference image as a reference pattern, and by matching the reference pattern and a pattern of a target image, an absolute difference may be calculated.

The reference image may be an image selected between two images acquired by a stereo camera, and the other image may be defined as a target image.

The window generator 200 may generate a plurality of windows, each including at least one pixel, by receiving texture information, included in the acquired image information, from a user, or by dividing texture information by a predetermined size.

In one exemplary embodiment, the size of windows may be input from a user or may be predetermined, and the windows may be generated to be N×N in size, with N number of rows and columns of pixels.

In this manner, windows may be generated by dividing texture images of a reference image and a target image by an N×N size.

In one exemplary embodiment, the window size may be predetermined according to predetermined criteria, depending on resolution of a received texture image or the types of objects of a texture image.

The window mask generator 300 may have the same size as the size of generated windows, and may generate a window mask that may be used to convert pattern information, included in the acquired image information, according to a predetermined algorithm.

The window mask will be described in further detail with reference to FIG. 3.

Figure 3:
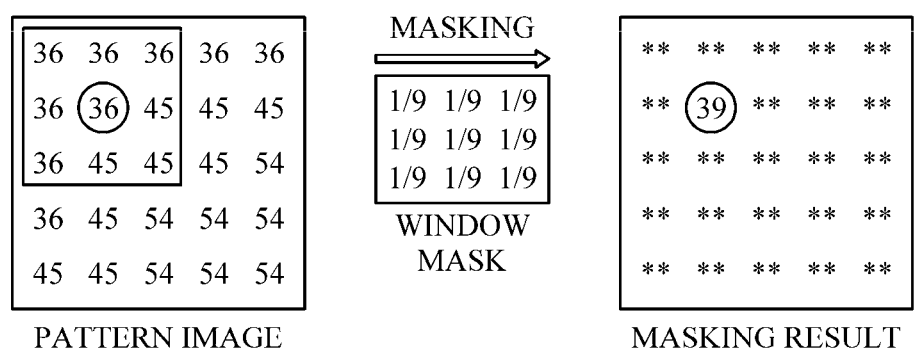
FIG. 3 is a diagram illustrating a window mask according to an exemplary embodiment.

FIG. 3 is a diagram illustrating a window mask according to an exemplary embodiment.

Referring to FIG. 3, a window mask, having the same size as the size of generated windows, may be generated for a texture image.

As illustrated in FIG. 3, in the case where the window size is 3×3, i.e., having 9 pixels, a window mask is also 3×3 in size, i.e., having 9 pixels, such that the window size is equal to the size of a window mask.

In FIG. 3, image data is converted by using a window mask generated in a 3×3 matrix window.

Further, the window mask has nine values of 1/9 in a 3×3 array of pixels, with each 1/9 being multiplied by each pixel value in a 3×3 matrix window, and masking is performed by combining the multiplied values, such that the 3×3 matrix window is converted into a decimal number of 39.

The algorithm predetermined for the conversion may use a method of multiplying values in a window mask and combining multiplied values as illustrated in FIG. 3, but is not limited thereto, and any algorithm that may convert pattern information may also be used.

In one exemplary embodiment, the mask may include a set value for masking, and the set value for masking may vary depending on a camera setting of a received texture image, a light amount, a state of lighting, and image resolution.

In the case where a set value for masking is greater than a predetermined value, a window mask that includes all the pixels in the window may be generated, and in the case where a set value for masking is lower than a predetermined value, a window mask having a predetermined number of pixels may be generated.

The set value for masking may be generated by calculating a difference between peripheral pixels and center pixels of a window.

The window masker 400 may perform masking of a reference image and a target image by using a generated window mask to convert pattern information of the reference image and pattern information of the target image.

In one exemplary embodiment, by masking pattern information using the generated window mask, an image of pattern information having an N×N matrix may be converted into decimal numbers or binary numbers according to a predetermined algorithm.

Figure 4:
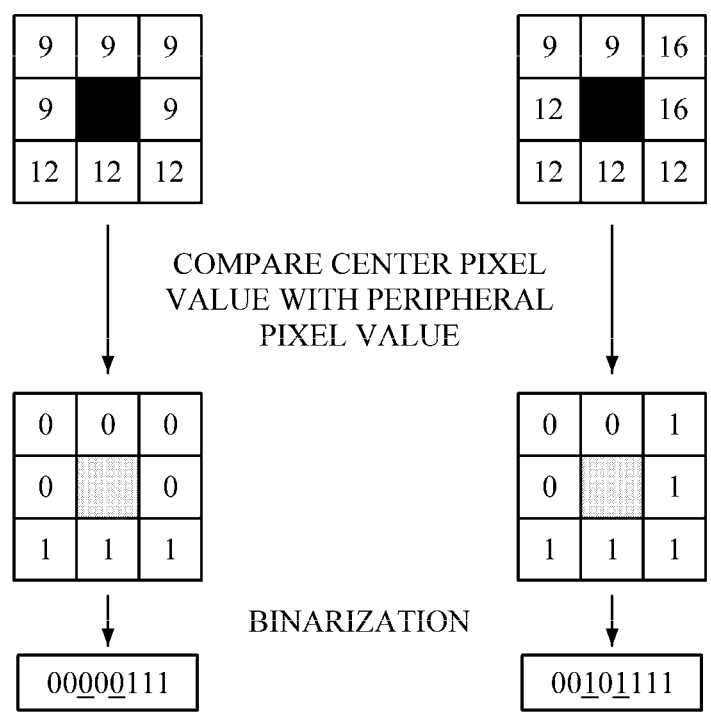
FIG. 4 is a diagram illustrating an example of masking by using census transform according to an exemplary embodiment.

The masking may be performed by using an algorithm for converting pattern information into decimal numbers as illustrated in FIG. 3, but is not limited thereto, and any algorithm that may convert pattern information into a specific desired format, such as an algorithm for converting pattern information into binary numbers as illustrated in FIG. 4, may also be used.

FIG. 4 is a diagram illustrating an example of masking by using census transform according to an exemplary embodiment.

Referring to FIG. 4, based on a center pixel value of pattern information corresponding to the size of a generated window mask, a value greater than the center pixel value may be indicated as 1, and a value lower than the center pixel value may be indicated as 0, by using census transform.

Pattern information may be converted into binary numbers by masking of a 3×3 matrix, in which eight numbers thus indicated are read from the left to the right one row after another.

The raw-cost calculator 500 may calculate a raw cost by calculating a difference obtained by matching pattern information of a masked target image with pattern information of a masked reference image.

In one exemplary embodiment, by preparing a pattern of a reference image as a reference pattern, and by comparing the reference pattern with a pattern of a target image (pattern matching), an absolute difference may be obtained, and a raw cost may be calculated based on the absolute difference.

The raw cost refers to a value of similarity between two images captured by two cameras disposed with a base line therebetween in stereo matching.

In order to indicate the similarity in numbers, an absolute difference between two images may be generated to be used as a raw cost.

The raw cost may be arrayed in a 3D matrix (width×height×disparity).

An absolute difference will be described with reference to FIG. 5.

Figure 5:
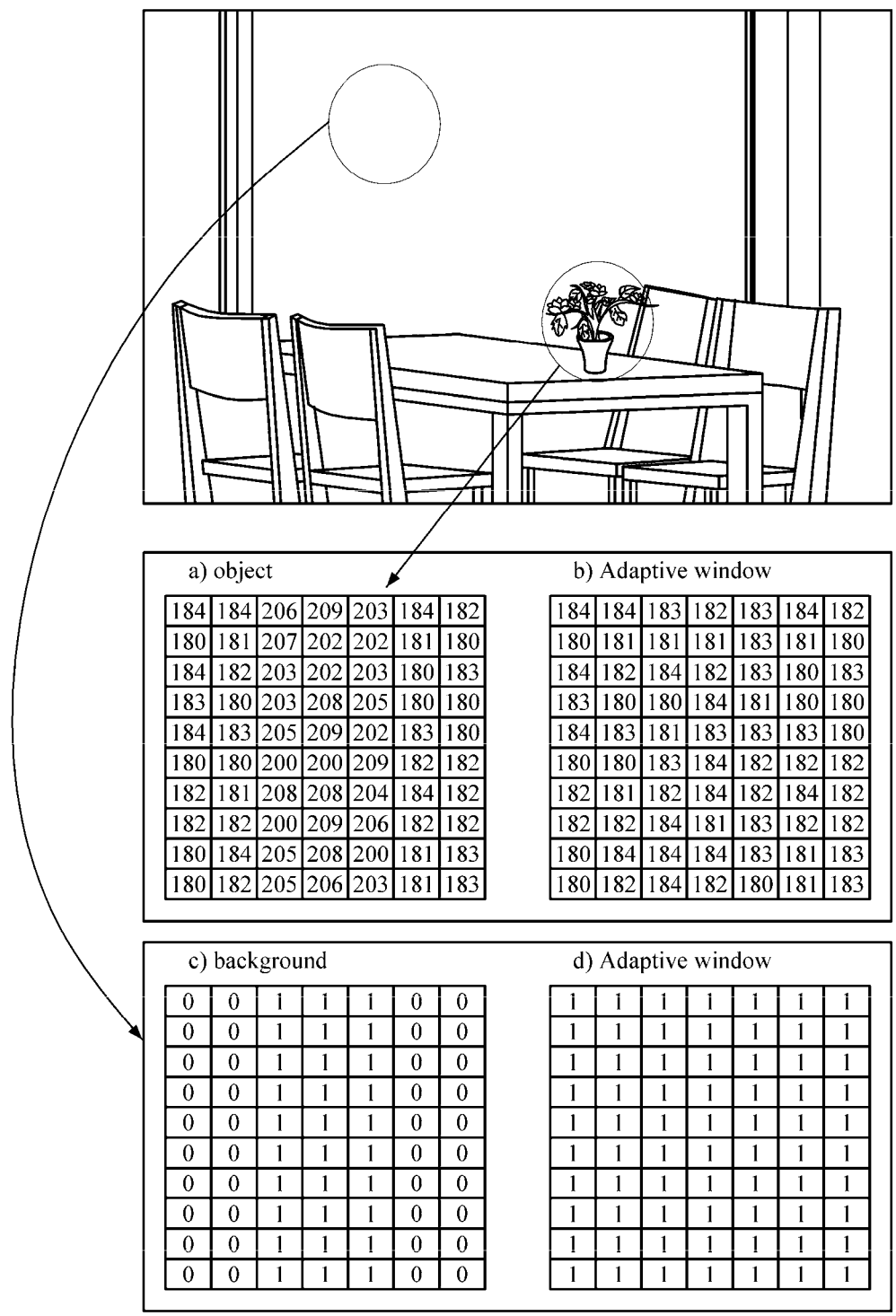
FIG. 5 is a diagram illustrating a maximum absolute difference D between images.

FIG. 5 is a diagram illustrating a maximum absolute difference D between images.

As illustrated in FIG. 5, an absolute difference D may be a difference generated by matching patterns of a reference image and a target image.

A method of calculating an absolute difference will be described with reference to FIG. 6.

Figure 6:
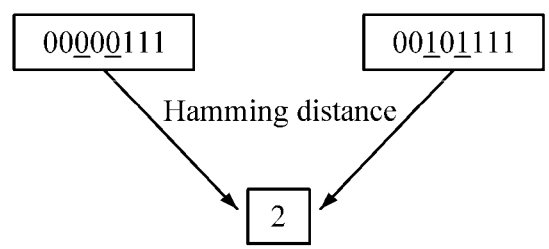
FIG. 6 is a diagram illustrating an example of calculating an absolute difference by using a Hamming distance method when a matrix is converted into binary numbers by masking, according to an exemplary embodiment.

FIG. 6 is a diagram illustrating an example of calculating an absolute difference by using a Hamming distance method when a matrix is converted into binary numbers by masking, according to an exemplary embodiment.

Referring to FIG. 6, binary numbers, calculated by masking pattern information of a reference image and a target image, are matched bit-by-bit, in which in the case where matched binary numbers are identical, the numbers are converted into 0, and in the case where matched binary numbers are different, the numbers are converted into 1, and the converted numbers are combined to calculate an absolute difference.

A hamming distance may be used as a method of calculating an absolute difference, but the method is not limited thereto, and any method that may calculate a value of difference between images may also be used.

Figure 7:
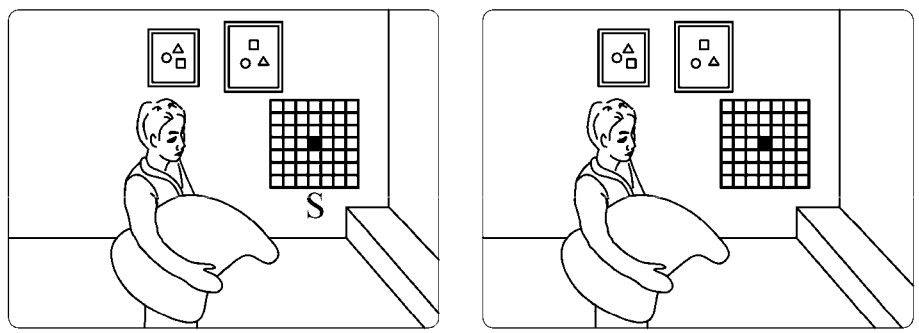
FIG. 7 is a diagram illustrating an example of calculating a raw cost using a Sum of Absolute Differences (SAD) according to an exemplary embodiment.

FIG. 7 is a diagram illustrating an example of calculating a raw cost using a Sum of Absolute Differences (SAD) according to an exemplary embodiment.

FIG. 7 illustrates calculating a raw cost by using a Sum of Absolute Differences (SAD) as an example of calculating a raw cost by using a calculated absolute difference.

By defining an absolute difference d generated by matching windows S of a specific size, with the width and length defined as X, Y, a raw cost may be calculated by using $$C(x, y, d) = \sum_{x \in S} |I_R(x, y) - I_T(x + d, y)|.$$

A Sum of Differences (SAD) may be used as a method of calculating a raw cost, but the method is not limited thereto, and any method that may calculate a raw cost by using a width×height×disparity type.

In one exemplary embodiment, an absolute difference, calculated by matching windows of a generated reference image and windows of a target image, on an X axis is defined as W, an absolute difference on a Y axis is defined as H, and a maximum absolute difference between images having the X axis and Y axis is defined as D, and a volume of a raw cost may be calculated by using the defined values W, H, and D and according to a predetermined algorithm, and a final raw cost may be calculated by combining the calculated volume of raw cost with adjacent pixels.

Figure 8:
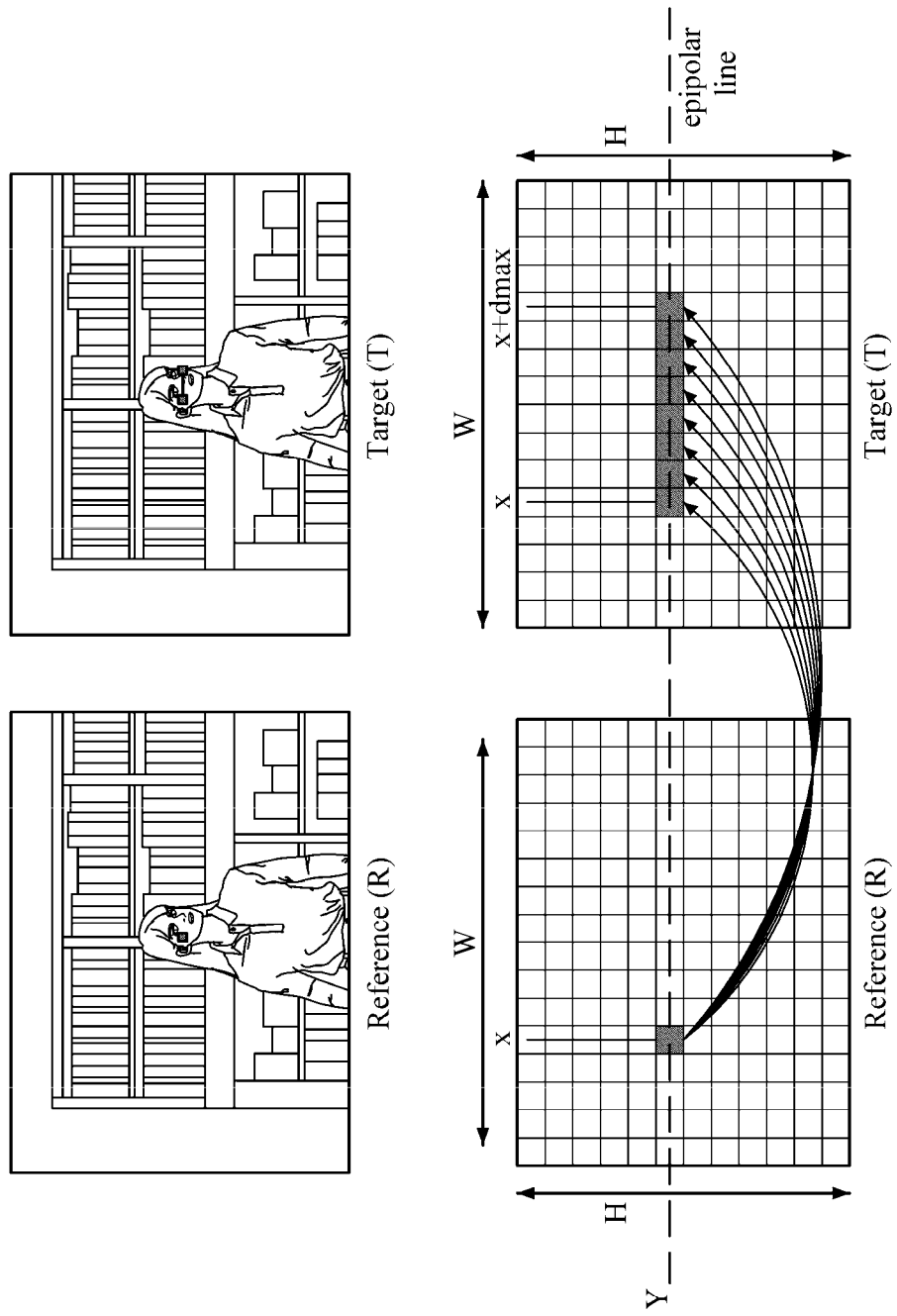
FIG. 8 is a diagram illustrating an example of windows generated differently depending on objects of an image.

FIG. 8 is a diagram illustrating an example of windows generated differently depending on objects of an image.

Referring to FIG. 8, in the case where there is no color difference between a center point of an object and adjacent pixels, and in the case where there is color difference therebetween, windows are generated differently depending on objects of an image.

In the case where there is no color difference between a center point of an object and adjacent pixels, as in an image with no object included in a background, windows are generated for an entire image, such that there is no difference from a case where no windows are used. However, in an image that includes the boundary of an object, there is a color difference between center pixels and adjacent pixels, such that it is desired to use windows to determine the image boundary more clearly, thereby enabling efficient calculation of a raw cost.

Figure 9:
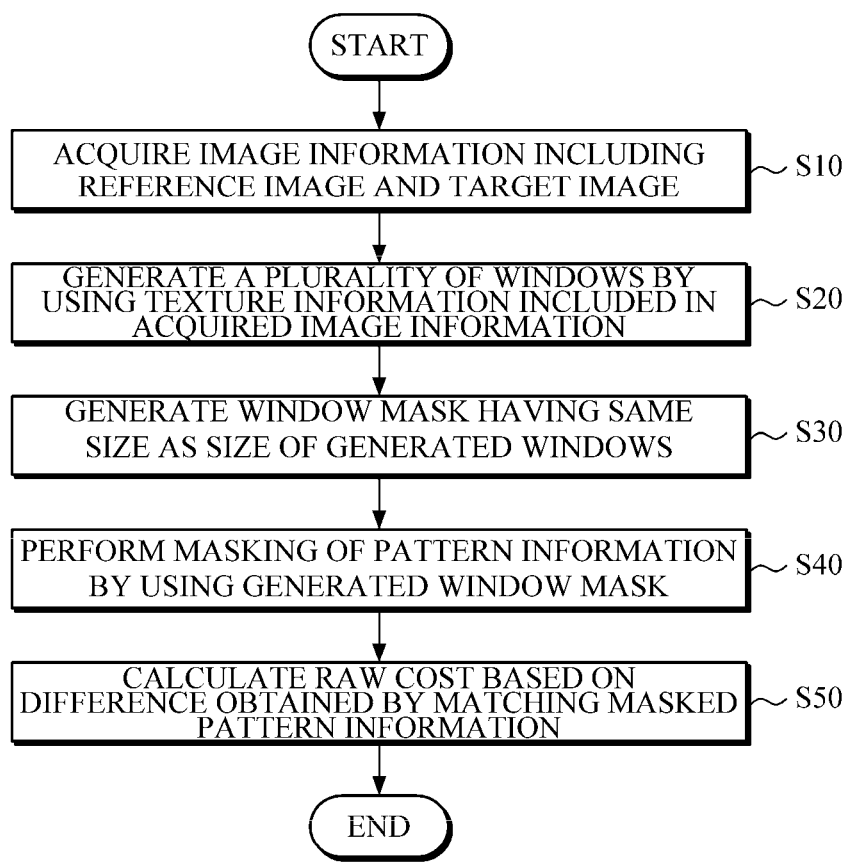
FIG. 9 is a flowchart illustrating a raw-cost calculation method using an adaptive window mask according to an exemplary embodiment.

FIG. 9 is a flowchart illustrating a raw-cost calculation method using an adaptive window mask according to an exemplary embodiment.

Image information including a reference image and a target image is acquired in S10.

In one exemplary embodiment, image information may be acquired, which includes pattern and texture information of a reference image and pattern and texture information of a target image.

By preparing a pattern of a reference image as a reference pattern, and by matching the reference pattern and a pattern of a target image (pattern matching), an absolute difference may be calculated.

A plurality of windows are generated by using texture information included in the acquired image information in S20.

In one exemplary embodiment, by receiving texture information, included in the acquired image information, from a user, or by dividing texture information by a predetermined size, a plurality of windows, each having at least one pixel, may be generated.

In the exemplary embodiment, the size of windows may be input from a user or may be predetermined, and windows may be generated to be N×N in size, with N number of rows and columns of pixels.

The size of windows may be predetermined according to predetermined criteria, depending on resolution of a received texture image, or the types of objects of a texture image.

A window mask, having the same size as the size of generated windows, is generated in S30.

In the exemplary embodiment, a window mask may be generated, which has the same size as the size of generated windows, and pattern information, included in the acquired image information, may be converted according to a predetermined algorithm.

In the exemplary embodiment, the window mask may include a set value for masking, and the set value for masking may vary depending on a camera setting of a received texture image, a light amount, a state of lighting, and image resolution.

In the exemplary embodiment, in the case where the set value for masking is greater than a predetermined value, a window mask, which includes all the pixels of windows, may be generated, and in the case where the set value for masking is lower than a predetermined value, a window mask having a predetermined number of pixels may be generated.

Masking of pattern information is performed by using the generated window mask in S40.

In the exemplary embodiment, the masking may be performed by using the generated window mask so that pattern information of a received reference image and pattern information of a target image may be converted.

In the exemplary embodiment, by masking pattern information using the generated window mask, an image of pattern information having an N×N matrix may be converted into decimal numbers or binary numbers according to a predetermined algorithm.

A raw cost may be calculated based on a difference obtained by matching masked pattern information in S50.

In the exemplary embodiment, by matching pattern information of a masked reference image and pattern information of a masked target image, a difference between pattern information of the masked reference image and pattern information of the masked target image may be obtained, and a raw cost may be calculated based on the difference.

In the exemplary embodiment, by preparing a pattern of a reference image as a reference pattern, and by matching the reference pattern and a pattern of a target image, an absolute difference may be obtained, and a raw cost may be calculated based on the difference.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. Further, the above-described examples are for illustrative explanation of the present invention, and thus, the present invention is not limited thereto.

What is claimed is:

1. An apparatus that performs raw-cost calculation using an adaptive window mask, the apparatus comprising:
   an image acquirer configured to acquire image information that includes pattern and texture information of a reference image, and pattern and texture information of a target image, wherein the reference image and the target image comprise a stereo image;

a window generator configured to generate a plurality of windows, each including at least one pixel, by receiving the texture information, included in the acquired image information, and having respective shapes determined depending on types of objects of the texture information of the reference image or target image;

a window mask generator configured to generate a window mask, which has a same shape as a shape of the generated windows, and is capable of converting the pattern information, included in the acquired image information, according to a predetermined algorithm;

a window masker configured to perform masking of the reference image and the target image the by using the generated window mask to convert the pattern information of the reference image and the pattern information of the target image included in the acquired image information; and a raw-cost calculator configured to match pattern information of the masked reference image and pattern information of the masked target image to calculate a difference, and to calculate a raw cost based on the difference, wherein the reference image and the target image are combined, using the calculated raw cost, to produce a three-dimensional (3D) image.

2. The apparatus of claim 1, wherein the window mask generator generates the window mask that includes a set value for masking, wherein the set value for masking varies depending on a camera setting of the received texture image, a light amount, a state of lighting, and image resolution.

3. The apparatus of claim 2, wherein the window mask generator generates the window mask that includes all pixels of windows in response to the set value for masking being greater than a predetermined value.

4. The apparatus of claim 1, wherein by assuming that an absolute difference, calculated by matching windows of the generated reference image and windows of the target image, on an X axis is defined as W, an absolute difference on a Y axis is defined as H, and a maximum absolute difference between images having the X axis and Y axis is defined as D, the raw cost calculator calculates a volume of the raw cost by using the defined values W, H, and D and according to a predetermined algorithm, and calculates a final raw cost by combining the calculated volume of raw cost with adjacent pixels.

5. A method for producing three-dimensional (3D) images by performing a raw-cost calculation using an adaptive window mask, the method comprising:

acquiring image information that includes pattern and texture information of a reference image, and pattern and texture information of a target image, wherein the reference image and the target image comprise a stereo image;

generating a plurality of windows, each including at least one pixel, by receiving the texture information, included in the acquired image information, and having respective shapes determined depending on types of objects of the texture information of the reference image or target image;

generating a window mask, which has a same shape as a shape of the generated windows, and is capable of converting the pattern information, included in the acquired image information, according to a predetermined algorithm;

performing masking of the reference image and the target image by using the generated window mask to convert the pattern information of the reference image and the pattern information of the target image included in the acquired image information;

matching pattern information of the masked reference image and pattern information of the masked target image to calculate a difference, and calculating a raw cost based on the difference; and producing the 3D image by combining, using the calculated raw cost, the reference image and the target image.

6. The method of claim 5, wherein the generating of the window mask comprises generating the window mask that includes a set value for masking, wherein the set value for masking varies depending on a camera setting of the received texture image, a light amount, a state of lighting, and image resolution.

7. The method of claim 6, wherein the generating of the window mask comprises generating the window mask that includes all pixels of windows in response to the set value for masking being greater than a predetermined value.

8. The method of claim 5, wherein by assuming that an absolute difference, calculated by matching windows of the generated reference image and windows of the target image, on an X axis is defined as W, an absolute difference on a Y axis is defined as H, and a maximum absolute difference between images having the X axis and Y axis is defined as D, the calculation of the raw cost comprises calculating a volume of the raw cost by using the defined values W, H, and D and according to a predetermined algorithm, and calculating a final raw cost by combining the calculated volume of raw cost with adjacent pixels.

* * * * *